US011619941B2

(12) United States Patent
Biesenbeek et al.

(10) Patent No.: US 11,619,941 B2
(45) Date of Patent: Apr. 4, 2023

(54) METHOD FOR CONTROLLING A DRIVING CONDITION FOR A TRACTOR OF AN AGRICULTURAL MACHINE AND AN AGRICULTURAL MACHINE

(71) Applicant: KVERNELAND GROUP MECHATRONICS B.V., Nieuw-Vennep (NL)

(72) Inventors: Sander Biesenbeek, Nieuw-Vennep (NL); Peter Van Der Vlugt, Hoofddorp (NL)

(73) Assignee: KVERNELAND GROUP MECHATRONICS B.V., Nieuw-Vennep (NL)

(*) Notice: Subject to any disclaimer, the term of this patent is extended or adjusted under 35 U.S.C. 154(b) by 298 days.

(21) Appl. No.: 16/956,440

(22) PCT Filed: Nov. 30, 2018

(86) PCT No.: PCT/EP2018/083238
§ 371 (c)(1),
(2) Date: Jun. 19, 2020

(87) PCT Pub. No.: WO2019/120954
PCT Pub. Date: Jun. 27, 2019

(65) Prior Publication Data
US 2021/0080958 A1 Mar. 18, 2021

(30) Foreign Application Priority Data
Dec. 21, 2017 (EP) .................................. 17209491

(51) Int. Cl.
*G05D 1/02* (2020.01)
*A01C 15/00* (2006.01)
(Continued)

(52) U.S. Cl.
CPC ............ *G05D 1/021* (2013.01); *A01C 15/006* (2013.01); *A01C 21/00* (2013.01); *G01G 19/08* (2013.01);
(Continued)

(58) Field of Classification Search
CPC ................. G05D 1/021; G05D 1/0094; G05D 2201/0201; A01C 15/006; A01C 21/00;
(Continued)

(56) References Cited

U.S. PATENT DOCUMENTS 6,253,691 B1 * 7/2001 McQuinn ............... A01C 7/208
111/925
2005/0165521 A1 * 7/2005 Gruhn .................... A01B 45/00
701/29.5

(Continued)

FOREIGN PATENT DOCUMENTS

DE 3642502 A1 6/1988
EP 0407705 A1 1/1991
(Continued)

OTHER PUBLICATIONS

International Search Report issued in connection with PCT/EP2018/083238 dated Mar. 6, 2019.

*Primary Examiner* — Frederick M Brushaber
(74) *Attorney, Agent, or Firm* — Dennemeyer & Associates LLC

(57) ABSTRACT

The invention relates to controlling a driving condition for an agricultural machine having a tractor, an implement for applying materials selected from the group of granular material, liquid material, and a powder-form material, the implement carried or trailed by the tractor and comprising a supply container, an application device, and a weight sensor device having at least one weight sensor and configured to sense an empty weight and a filling weight for the supply (Continued)

container. A tractor implement management system is provided and is operationally connected to the weight sensor device and configured for controlling driving conditions of the tractor. The method comprises driving the tractor, measuring first weight signals, indicative of a first driving condition, providing first tractor control signals, generated in response to the first weight signals and configured to apply a first control condition to the tractor driving, for controlling the tractor driving.

12 Claims, 5 Drawing Sheets

(51) Int. Cl.
  *A01C 21/00* (2006.01)
  *G01G 19/08* (2006.01)
  *G05D 1/00* (2006.01)
  *A01C 17/00* (2006.01)

(52) U.S. Cl.
  CPC .......... *G05D 1/0094* (2013.01); *A01C 17/001* (2013.01); *G05D 2201/0201* (2013.01)

(58) Field of Classification Search
  CPC .... A01C 17/001; G01G 19/08; G01G 23/002; A01B 69/007
  See application file for complete search history.

(56) References Cited

U.S. PATENT DOCUMENTS

| | | | | |
|---|---|---|---|---|
| 2014/0343802 A1* | 11/2014 | Pichlmaier | ........... | A01B 63/112 701/50 |
| 2017/0083026 A1* | 3/2017 | Schmidt | ............... | A01B 69/008 |
| 2021/0179103 A1* | 6/2021 | Kowalchuk | ........... | B60W 50/14 |

FOREIGN PATENT DOCUMENTS

| | | | | |
|---|---|---|---|---|
| EP | 0537857 A2 | | 4/1993 | |
| EP | 0797082 A1 * | | 3/1997 | ............. G01G 19/12 |
| EP | 0797082 A1 | | 9/1997 | |
| EP | 2492162 A2 * | | 1/2012 | ............ B60W 30/14 |
| EP | 3251485 A1 * | | 5/2017 | ............ A01B 79/00 |
| JP | 2004329067 A | | 11/2004 | |

* cited by examiner

METHOD FOR CONTROLLING A DRIVING CONDITION FOR A TRACTOR OF AN AGRICULTURAL MACHINE AND AN AGRICULTURAL MACHINE

CROSS-REFERENCE TO RELATED APPLICATIONS

This is a 35 U.S.C. 371 National Stage Patent Application of International Application No. PCT/EP2018/083238, filed Nov. 30, 2018, which claims priority to European application 17209491.4, filed Dec. 21, 2017, each of which is hereby incorporated by reference in its entirety.

The present disclosure refers to a method for controlling a driving condition for a tractor of an agricultural machine and an agricultural machine.

BACKGROUND

Document EP 0 537 857 A1 discloses a device for disseminating or applying a granular or powder-form material, in particular fertilizer or herbicide/pesticide used in agriculture, said device comprising a frame carried by a vehicle, and carrying a supply container for the material to be disseminated and a mechanism for spreading said material, wherein at least one sensor operative between the frame and the supply container is arranged for measuring the own and the filling weight of the supply container, wherein the or each sensor is included in a signal processing and display circuit. Such type of agricultural machine is disclosed also in document EP 0 797 082 A1.

Document EP 0 407 705 A1 refers to a weighing machine for an agricultural tractor.

Document DE 36 42 502 A1 discloses an agricultural appliance combination, consisting of a farm tractor and a distributor machine, towed or mounted on the tractor, for the distribution of granular or pulverulent agricultural material. The farm tractor has a power take-off shaft, via which units of the distributor machine can be driven, and a sensor being arranged on the power take-off shaft which, according to the rotational speed of the power take-off shaft, supplies pulses corresponding to the particular rotational speed. In order to provide a simple monitoring and/or regulating device for distributor machines, provision is made for entering these power take-off shaft rotational-speed pulses as an actual value into control electronics controlling the distributor machine.

Document JP 2004 329067 A discloses a travel vehicle, such as a tractor, equipped with an application apparatus for applying a soil-conditioning material such as a fertilizer or an agrochemical to a field, which can uniformly apply the soil-conditioning material to the field without relating to changes in the speed of the travel vehicle. An application working machine comprises an application amount-controlling means for automatically controlling the application of the application apparatus on the basis of the speed of the travel vehicle.

SUMMARY

It is an object to provide improved operation and operation management in a method for controlling a driving condition for a tractor of agricultural machine and an agricultural machine.

For solving the problem a method for controlling a driving condition for a tractor of agricultural machine according to the claim 1 is provided. Further, an agricultural machine according to claim 11 is provided. Further embodiments are disclosed in dependent claims.

According to an aspect, a method for controlling a driving condition for a tractor of an agricultural machine is provided, the agricultural machine having a tractor; an implement having an application device for applying a material selected from the group of a granular material, a liquid material, and a powder-form material, the implement being carried or trailed by the tractor and comprising a supply container for receiving the material, an application device for applying the material, and a weight sensor device having at least one weight sensor configured to sense an empty weight and a filling weight for the supply container; and a tractor implement management system, the tractor implement management system operationally connected to the weight sensor device and configured to generate control signals for controlling driving conditions of the tractor. The method comprises: moving the agricultural machine by tractor driving; measuring first weight signals by the weight sensor device, the first weight signals indicative of a first driving condition for the movement of the agricultural machine; providing first tractor control signals in the tractor implement management system, the first tractor control signals generated in response to the first weight signals and configured to apply a first control condition to the tractor driving; and applying the first tractor control signals for controlling the tractor driving.

According to another aspect, an agricultural machine is provided, the agricultural machine having a tractor; an implement having an application device for applying a material selected from the group of a granular material, a liquid material, and a powder-form material, the implement being carried or trailed by the tractor and comprising a supply container for receiving the material, an application device for applying the material, and a weight sensor device having at least one weight sensor configured to sense an empty weight and a filling weight for the supply container; and a tractor implement management system, the tractor implement management system operationally connected to the weight sensor device and configured to generate control signals for controlling driving conditions of the tractor. The agricultural machine is configured to: move by tractor driving; measure first weight signals by the weight sensor device, the first weight signals indicative of a first driving condition for the movement of the agricultural machine; provide first tractor control signals in the tractor implement management system, the first tractor control signals generated in response to the first weight signals and configured to apply a first control condition to the tractor driving; and apply the first tractor control signals to control the tractor driving.

A plurality of weight sensors may be provided, thereby, implementing the weight sensor device with a weight sensor arrangement. In the weight sensor arrangement the weight sensors may be arranged in a sensor plane, e.g. a sensor plane beneath the supply container which may also be referred to as storage container. Alternatively, the weight sensors may be provided in a plurality of sensors planes. One or more of the sensor planes may be extending horizontally. For example, three weight sensors may be arranged in the corners of a triangle arrangement. Alternatively, the weight sensors may be provided on a circle line. Also, weight sensors may be provided in the corners of a square arrangement.

The tractor implement management system allows the implement having the application device to affect controlling of specific driving functions of the tractor, such as the forward speed. By letting the implement optimize its operation the overall agricultural system can achieve higher levels of productivity with less operator fatigue. Also, tractor driving may be made safer by the controlling proposed here.

The first control condition may be selected from the following group: tractor speed, shifting gear, fuel consumption, and tractor steering. In response to the weight signals, the speed of tractor driving may be increased or decreased. Alternatively or in addition, the gear of the tractor may be shifted. In case of a manual transmission, a user output may be output to the driver through a display of a terminal or control terminal provided in the tractor, the user output asking the user to shift gear. In an alternative embodiment or in addition, in response to the weight signals the steering control of the tractor may be amended, for example, by changing an angle of steering.

The method may further comprise: measuring non-weight signals by non-weight sensor device provided on the tractor or the implement, and generating the first tractor control signals in response to both the second weight signals and the non-weight signals. The non-weight sensor device is configured to provide non-weight sensor signals which may be indicative of a driving condition for the tractor or the agricultural machine and/or some other condition related to operation of at least one of the tractor and the implement provided with the application device. For example, the non-weight signals may be indicative of a mode of operation in which the material is applied or a mode of operation in which no material is applied. In addition or alternatively, the non-weight signals may be indicative of an amount of material applied within a time period. Also, the non-weight signals may be indicative of other modes of operation for the agricultural machine. The non-weight signals may be taken into account in the process of generating the tractor control signals together with the weight signals provided by the at least one weight sensor. For example, a preliminary tractor control signal generated in response to the weight signals may be amended, for example increased or decreased in response to the non-weight signals. In addition or alternatively, application of the tractor control signals generated in response to the weight signals may be delayed in response to the non-weight signals. Consequently, the tractor control signals are applied later in time. Non-weight signals may be provided for at least one of the tractor and the implement comprising the application device.

The non-weight sensor device may be having a sensor selected from the following group: speed sensor, location sensor, acceleration device, and voltage supply sensor. In an alternative embodiment or in addition, signals not directly provided by a sensor may be provided in the tractor implement management system and taken into account, together with the weight signals, in generating the tractor control signals for controlling driving conditions of the tractor. For example, a signal or data indicative of a present and/or an average fuel consumption sensor of the tractor may be provided.

The method may further comprise: measuring second weight signals by the weight sensor device, the second weight signals indicative of a second driving condition for the movement of the agricultural machine, wherein the second driving condition is different from the first driving condition; providing second tractor control signals in the tractor implement management system, the second tractor control signals being different from the first tractor control signals and generated in response to the second weight signals, wherein the second tractor control signals are configured to apply, to the tractor driving, a second control condition different from the first control condition; and controlling the tractor driving according to the second tractor control signals. Tractor driving is controlled in dependence on the first and second tractor control signals, thereby, responding to some change of driving conditions while the agricultural machine is moving by tractor driving. Tractor driving is adjusted dependent on conditions or parameters measured by one or more weight sensors. For example, the weight signals may indicate that a remaining amount of material to be applied or dispensed is below a threshold amount value. In response, speed of the tractor driving may be increased or decreased.

The measuring may comprise measuring first weight signals indicative of roughness of ground over which the agricultural machine is moving. For example, the first weight signals may indicate the supply container oscillating or swaying because of certain roughness condition of the ground over which the agricultural machine is moving. In response to such first weight signals, for example, the speed of tractor driving may be decreased for limiting or preventing the supply container from oscillating.

The measuring may comprise measuring first weight signals indicative of ground slope of the ground over which the agricultural machine is moving. For example, weight sensors provided on opposite sides along a line extending transversely to a driving direction may indicate that the supply container is tilted to one side because of ground slope. In response to such first weight signals speed of the tractor driving may be decreased for reducing dangerous driving situations. Alternatively or in addition, the steering angle for the steering of the tractor may be amended in response to the first weight signals.

The measuring may comprise measuring first weight signals indicative of present speed of the movement for the agricultural machine. For example, weight sensors provided in front and back may provide different weight signals indicating that the supply container is tilted or inclined to the back, such weight signals being indicative of rather high speed tractor driving. In response to the first weight signals, for example, speed of tractor driving may be decreased.

The measuring may comprise measuring first weight signals indicative of present speed-up of the movement for the agricultural machine. In response to the first weight signals indicative of present speed-up of tractor driving, the speed-up may be increased further or decreased. For example, different first weight signals provided by a weight sensor in the front and a weight sensor in the back of the application device may be indicative of (too much) speed-up of the movement of the agricultural machine.

The measuring may comprise measuring first weight signals indicative of a curve radius of movement for the agricultural machine. The distribution of first weight signals from different weight sensors located along a line of a sensor arrangement may be indicative of a curve radius of the movement of the agricultural machine. If the curve radius indicated is determined to be too sharp, in response to the first weight signals steering of the tractor may be adjusted for widening the curve radius.

One or more reference sensor devices having at least one reference sensor may be provided, for example, on a frame member. The at least one reference sensor is configured to sense reference signals following, with respect to one or more weight sensors, adverse effects resulting from shaking or inclining position of the application device, such as the supply container. The reference signals, together with the first and/or second weight sensor signals, may be taken into account for generating the first/second tractor control signals.

With regard to the agricultural machine, the aspects disclosed for the method for controlling the driving condition for the tractor of the agricultural machine may apply mutatis mutandis. The application device may be selected from the following group: spreader, sprayer, and seeder.

According to an alternative aspect, a method for controlling a driving condition for a tractor of an agricultural machine may be provided, the agricultural machine having a tractor; an implement having an application device for applying a material selected from the group of a granular material, a liquid material, and a powder-form material, the implement being carried or trailed by the tractor and comprising a supply container for receiving the material, an application device for applying the material, and a reference sensor device having at least one reference sensor configured to sense reference signals following, with respect to one or more weight sensors, adverse effects resulting from shaking or inclining position of the application device, such as the supply container; and a tractor implement management system, the tractor implement management system operationally connected to the reference sensor device and configured to generate control signals for controlling driving conditions of the tractor. The method comprises: moving the agricultural machine by tractor driving; measuring first reference signals by the reference sensor device, the first reference signals indicative of a first driving condition for the movement of the agricultural machine; providing first tractor control signals in the tractor implement management system, the first tractor control signals generated in response to the first reference signals and configured to apply a first control condition to the tractor driving; and applying the first tractor control signals for controlling the tractor driving.

According to another alternative aspect, an agricultural machine is provided, the agricultural machine having a tractor; an implement having an application device for applying a material selected from the group of a granular material, a liquid material, and a powder-form material, the implement being carried or trailed by the tractor and comprising a supply container for receiving the material, an application device for applying the material, and a reference sensor device having at least one reference sensor configured to sense reference signals following, with respect to one or more weight sensors, adverse effects resulting from shaking or inclining position of the application device, such as the supply container; and a tractor implement management system, the tractor implement management system operationally connected to the reference sensor device and configured to generate control signals for controlling driving conditions of the tractor. The agricultural machine is configured to: move by tractor driving; measure first reference signals by the reference sensor device, the first reference signals indicative of a first driving condition for the movement of the agricultural machine; provide first tractor control signals in the tractor implement management system, the first tractor control signals generated in response to the first reference signals and configured to apply a first control condition to the tractor driving; and apply the first tractor control signals to control the tractor driving.

With regard to the alternative aspects, the embodiments disclosed above for the method for controlling the driving condition for the tractor and the agricultural machine comprising the first weight sensor for detecting the first weight sensor signals may apply mutatis mutandis.

BRIEF DESCRIPTION OF THE DRAWINGS

Following, further embodiments are described by referring to figure. In the figures show.

DETAILED DESCRIPTION OF THE DRAWINGS

Figure 1:
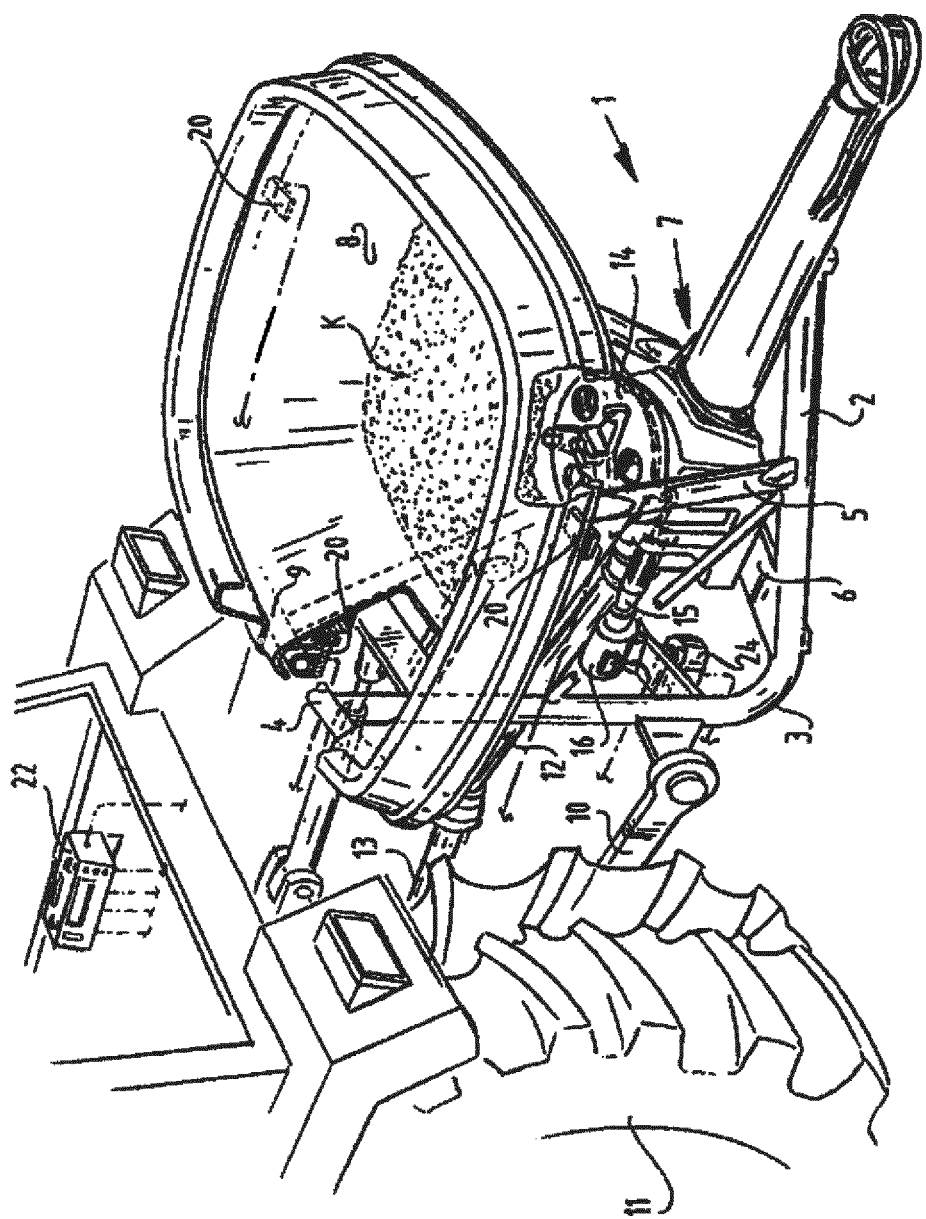
FIG. 1 a perspective top view of an application device provided with a spreading device in the form of a reciprocating spout broadcaster which is suspended from the three-point hitch of an agricultural tractor.

Referring to FIG. 1, an agricultural machine having an application device 1 for disseminating or spreading granular or powder-form material, such as fertilizer or herbicide/pesticides etc., is shown. In the exemplary embodiment shown, the application device 1 comprises a frame 2 in the form of two L-shaped tubes 3 which are mutually connected at the top by a peripheral tube 4, a shore 5, wherein this latter extends between the horizontal leg of tube 2 and the upper tube, a support plate 6 on which a reciprocating mechanism 7 is supported. Above the reciprocating mechanism lies a supply container 8 which here takes the form of an open hopper-like container, the outer edge 9 of which rests on the peripheral frame tube 4 via weight sensors to be elucidated further below.

The frame 2 is coupled via fixing means to a three-point hitch 10 of an agricultural tractor 11. The reciprocating mechanism 7 is driven via an intermediate shaft 12 by a power take-off 13 of the agricultural tractor.

Placed between supply container 8 and reciprocating mechanism 7 is a dosing member 14, which can be adjusted by a dosage adjusting mechanism 15 which can be adjusted by a control or adjusting motor 16. The adjusting motor is an actuator which can be electrically energized in very precise manner, whereby a very precise linear displacement can be obtained. This linear movement can be monitored by means of a potentiometer, whereby calibration is simplified and the location of the dosing mechanism as well as the position thereof can be determined.

Supply container 8 is filled with a quantity of a material K to be applied or dispensed, such as a granular material, a powder-form material or a liquid material. In case of the liquid material to be dispensed, the supply container may be a closed container. The material K causes a determined filling weight.

Arranged between the upper edge of supply container 8 and the peripheral frame tube 4 is a weight sensor device 20 comprising, in the embodiment shown, three weight sensors (weight sensor arrangement). The weight sensor device 20 may be assigned an electric control unit (ECU). In case of a weight sensor arrangement comprising a plurality of weight sensors, a single ECU may be assigned to the weight sensor arrangement. Alternatively, each of the weight sensors may be assigned its own ECU.

Figure 2:
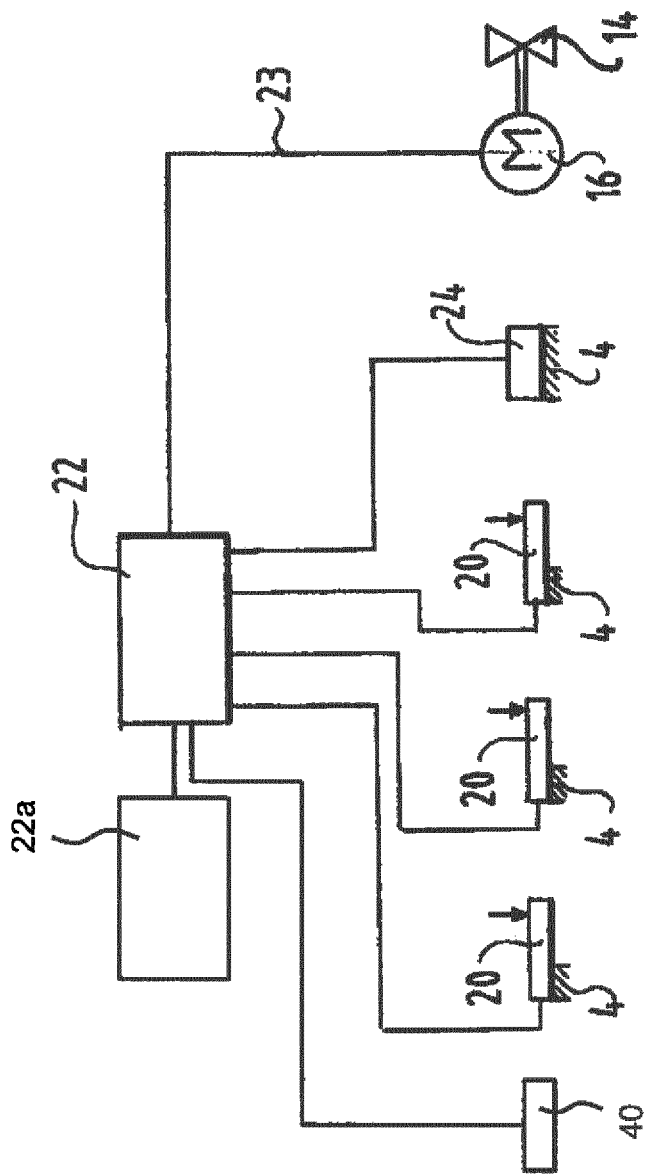
FIG. 2 a schematic view of a weight sensor circuit applied in the application device of FIG. 1.
Figure 5:
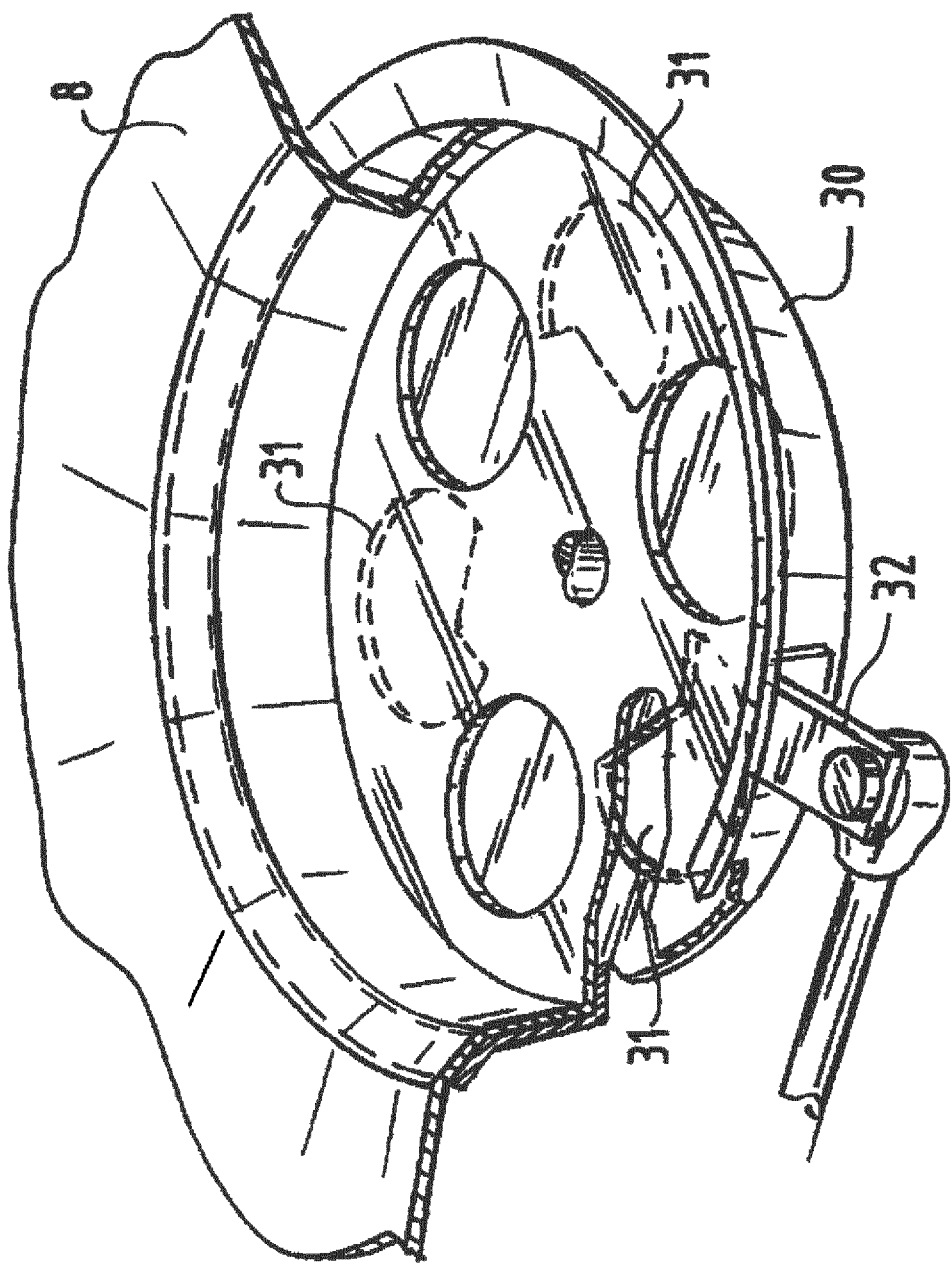
FIG. 5 a perspective view of a dosing mechanism.

In FIG. 2 the weight sensor device 20 is shown schematically, which weight sensor device 20 preferably is provided with a bending arm, the one end of which is connected to frame tube 4 and the other end to the edge of supply container 8, see also FIG. 5. The connection can be affected in simple manner by socket or screw bolts, wherein it is noted that strain gauges are accommodated in known manner in the bending arm which can measure the deflection of bending arm. The weight measurement signal is fed to a central processing unit 22, see FIG. 2, which can be placed in the cab of the tractor 11. The signal processing unit 22 sends a signal via line 23 to the control or adjusting motor 16 of dosing mechanism 14.

Figure 3:
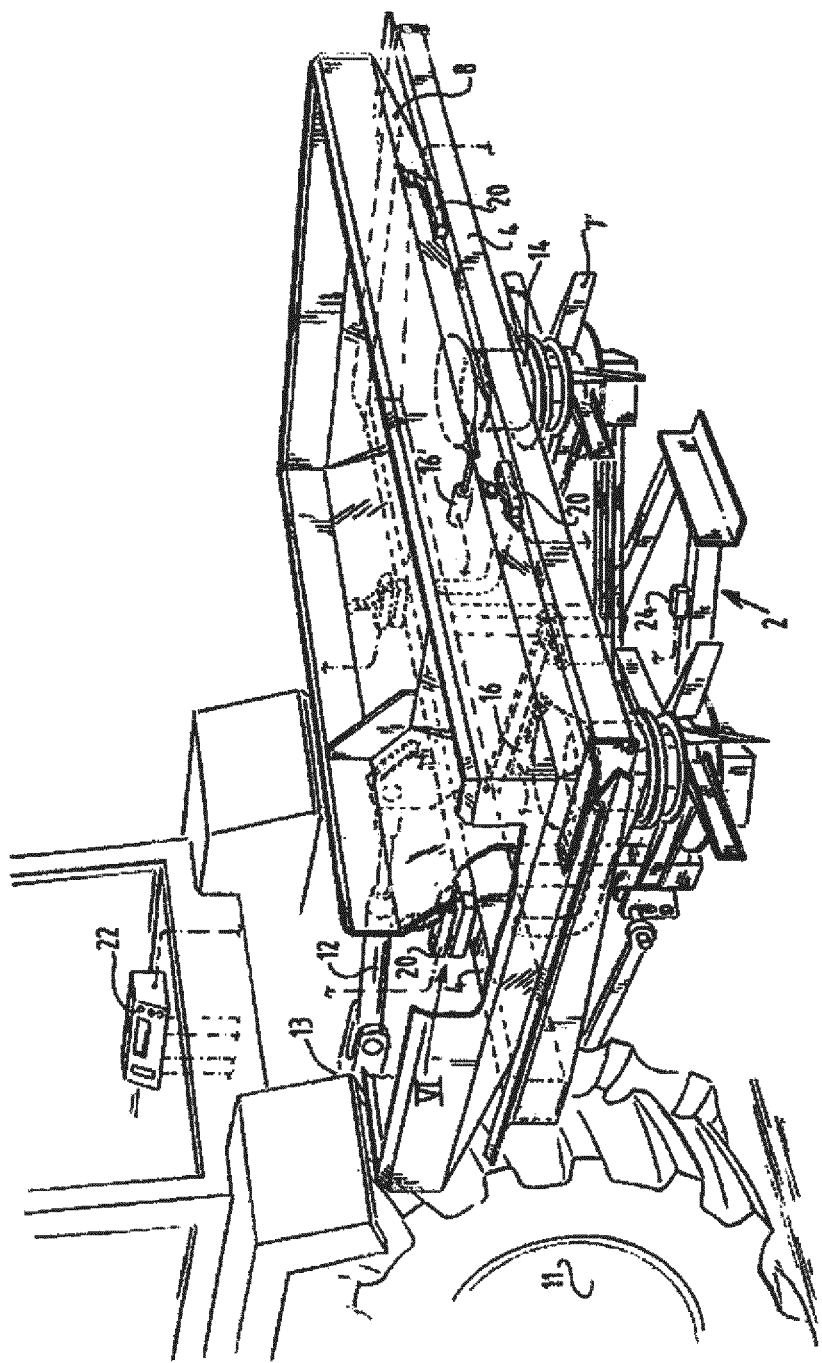
FIG. 3 a perspective view corresponding with FIG. 1 of a second embodiment of a spreader in the form of a double broadcaster.

The signal processing unit 22 is provided in or connected to a tractor implement management system (TIM system) 22*a* (see FIGS. 2 and 3). The tractor implement management system 22*a* is operatively connected to the one or more ECU of the weight sensors, thereby, allowing transmission of signals. The tractor implement management system 22*a* allows an implement to affect controlling of specific functions of the tractor, such as the forward speed. By letting the implement optimize its operation the overall agricultural system can achieve higher levels of productivity with less operator fatigue.

The tractor implement management system 22*a* is configured to generate control signals for controlling driving conditions of the tractor 11. The control signals, for example, may apply to at least one of the following driving conditions: speed, acceleration, fuel consumption, and steering. Functional components of the tractor 11 such as motor and steering may be assigned an ECU provided in a tractor control system to be distinguished form a implement control system and/or the tractor implement management system 22*a*. The different ECUs may be connected through data bus connection.

It is noted that a free bending arm providing a reference sensor 24 which serves as reference can be mounted at a random location on the frame 2, here on the support beam for the control or adjusting motor 16 or on the supply container 8.

This reference sensor 24 is in fact unloaded by its own weight and only follows the adverse error effects resulting from shaking or the inclining position of the application device 1, specifically the supply container 8. The signal processing takes place in the central processing unit 22 and thereby may correct the measurement signals of bending arms. In this manner the change in the filling weight of supply container 8 can be followed very quickly, directly and accurately and the dosage can thus be readjusted very precisely via the control or adjusting motor 16 and the dosing mechanism 14.

The central processing unit 22 can of course be provided with other input signals, for instance the driving speed of the tractor, wherein the type of material for disseminating, the weather condition factors as well as the desired nominal distribution are entered manually.

FIG. 3 shows a second embodiment of the spreading device, wherein the same reference numerals as in FIG. 1 are used for the same components.

Figure 4:
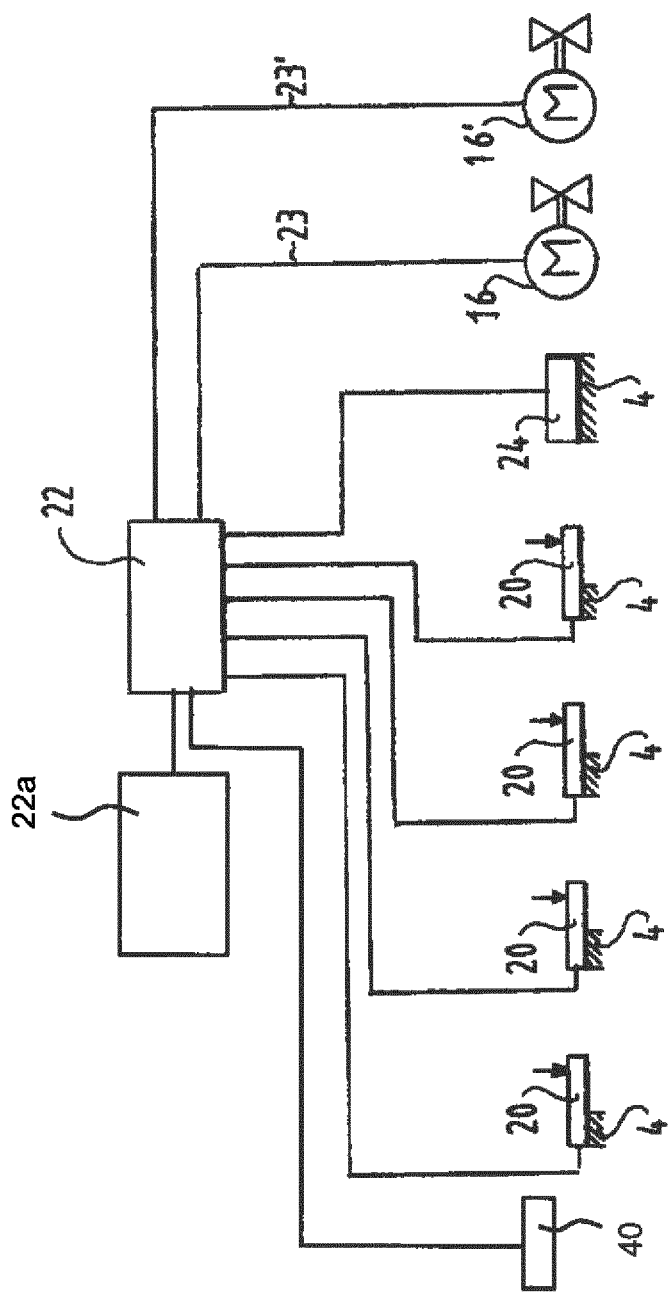
FIG. 4 a diagram corresponding with FIG. 2 of the circuit in the application device of FIG. 3.

Here also a frame is embodied with a peripheral profile beam 4 on which the upper edge of supply container 8 supports. Supply container 8 is embodied here as a double hopper-like container, each with its own passage opening onto which connects a dosing mechanism 14 under which a rotating broadcaster 7' is arranged. The dosing mechanism is adjusted by a control or adjusting motor 16. In this embodiment four bending arm sensors are arranged, see also FIG. 4, the measurement signals of which are fed to the central processing unit 22. The central processing unit 22 sends signals via lines 23 and 23' to the control or adjusting motors 16, 16' coupled thereto, in order to adjust the associated dosing mechanism. Also arranged here is the reference sensor 24 which is arranged on a beam of frame 2, preferably in the central longitudinal plane or at the center of gravity of the separate tub.

In this embodiment a left/right measurement can be performed due to inclusion of the sensors in a separate circuit, so that the weight of the left-hand respectively right-hand container can be determined separately, thus enabling a separate, accurate adjustment of both dosing mechanisms.

In order to facilitate the dosing with the control or adjusting motor 16, which is actuated via the central processing unit 22, it is recommended to adapt the peripheral boundaries of the passage openings of the dosing mechanism, such that the ratio between the material flow and the area of the passage opening progresses in accordance with a quadratic function. This simplifies the calculation formula with which the software of the central processing unit 22 is provided.

In FIG. 5 can be seen that the dosing mechanism consists of a dish-shaped disc 30, in the base of which are formed three passage openings 31. The base of the supply container 8 has three corresponding passage openings, which however have a circular shape so that when disc 30 is rotated the holes more or less overlap each other. By providing openings 31 with a contour line as peripheral boundary, the area of the passage opening for the material flow can be changed by rotating disc 30 such that the function between the material flow and the area of the passage opening progresses quadratically, i.e. according to the formula $y=ax^2$, wherein y represents the material flow and x the angular adjustment of arm 32 which is coupled to the adjusting motor.

It is noted that both in the embodiment of FIG. 1 and that of FIG. 2 the arms of the weight sensors occupy different spatial positions. They are situated at the front in the travel direction of the tractor 11. This arrangement ensures a more rigid construction of the relatively heavy supply container 8 with filling (e.g. 3000 kilos) whereby lateral forces as a result of bends can be easily compensated by the rear bending arms, while braking and acceleration forces can be absorbed by the front bending arms.

It is further noted that the two or more weight sensors 20 lie precisely in one plane, which makes the measurement more accurate. The reference sensor 24 does not have to lie in that plane but must extend parallel thereto.

With regard to different embodiments, depending on the type of application device, the material K to be applied or dispensed is supplied from the supply container to one or more device for dispensing or applying the material. In case of a seeder the material K, namely seeds, may be provided to a so-called seeding heart for which different types are known as such. In the seeding heart the seeds are singled out. Following, the seeds are dispensed to the furrow. The supply container may be provided as a central supply container for a plurality of seeding rows. Alternatively, there may be an individual supply container for each seeding row. In a sprayer, the liquid material to be dispensed is supplied from the supply container 8 to one or more nozzles.

Referring to FIG. 2, in addition to the weight sensors of the weight sensor device 20, a non-weight related sensor 40 is provided. More than one non-weight sensor may be provided. The non-weight related sensor 40 may be selected from the following group: speed sensor, location sensor, fuel consumption sensor, acceleration device, and voltage supply sensor. By the non-weight sensor non-weight sensor signals are detected while the tractor 11 is moving, such as speed signals and/or location signals.

In response to the weight signals received in the central processing unit 22 provided in or connected to the tractor implement management system 22a, control signals for controlling a driving condition for tractor driving are provided. The weight signals are indicative of a driving condition for the agricultural machine moving over ground. In response to such indicated driving condition the control signals for controlling tractor driving are generated and applied by the tractor implement management system 22a for adjusting tractor driving while the agricultural machine with the tractor 11 and the implement is moving over the ground. Thereby, automatic control of tractor driving in dependence on the weight signals detected by the weight sensor device 22 can be implemented.

The features disclosed in this specification, the figures and/or the claims may be material for the realization of various embodiments, taken in isolation or in various combinations thereof.

The invention claimed is:

1. Method for controlling a propulsion driving condition for a farm tractor of agricultural machine for distribution of materials to land, having:
   a tractor;
   an implement having an application device for applying a material selected from the group of a granular material, a liquid material, and a powder-form material, the implement being carried or trailed by the tractor and comprising
      a supply container for receiving the material;
      an application device for applying the material; and
      a weight sensor device having a weight sensor configured to sense an empty weight and a filling weight for the supply container; and
   a tractor implement management system, the tractor implement management system operationally connected to the weight sensor device and configured to generate control signals for controlling propulsion driving conditions of the tractor as the weight is diminished by application of material out from the supply container;
the method comprising
   moving the agricultural machine by tractor driving;
   measuring first weight signals by the weight sensor device, the first weight signals indicative of a first driving condition for the movement of the agricultural machine;
   providing first tractor control signals in the tractor implement management system, the first tractor control signals generated in response to the first weight signals and configured to apply a first control condition to the tractor driving; and
   applying the first tractor control signals for controlling the tractor driving.

2. Method of claim 1, wherein the first control condition is selected from the following group: tractor speed, shifting gear, fuel consumption, and tractor steering.

3. Method of claim 1, further comprising
   measuring non-weight signals by a non-weight sensor device provided on the tractor or the implement; and
   generating the first tractor control signals in response to a second weight signal and the non-weight signals.

4. Method of claim 3, the measuring comprising measuring the non-weight signals by a non-weight sensor device having a sensor selected from the following group: speed sensor, location sensor, acceleration device, and voltage supply sensor.

5. Method of claim 1, further comprising
   measuring second weight signals by the weight sensor device, the second weight signals indicative of a second driving condition for the movement of the agricultural machine, wherein the second driving condition is different from the first driving condition;
   providing second tractor control signals in the tractor implement management system, the second tractor control signals being different from the first tractor control signals and generated in response to the second weight signals, wherein the second tractor control signals are configured to apply, to the tractor driving, a second control condition different from the first control condition; and
   controlling the tractor driving according to the second tractor control signals.

6. The method according to claim 1, wherein the measuring comprises measuring first weight signals indicative of roughness of ground over which the agricultural machine is moving.

7. The method according to claim 1, wherein the measuring comprises measuring first weight signals indicative of ground slope of the ground over which the agricultural machine is moving.

8. The method according to claim 1, wherein the measuring comprises measuring first weight signals indicative of present speed of the movement for the agricultural machine.

9. The method according to claim 1, wherein the measuring comprises measuring first weight signals indicative of present speed-up of the movement for the agricultural machine.

10. The method according to claim 1, wherein the measuring comprises measuring first weight signals indicative of a curve radius of the movement for the agricultural machine.

11. An agricultural machine having
    a tractor;
    an implement having an application device for applying a material selected from the group of a granular material, a liquid material, and a powder-form material, the implement being carried or trailed by the tractor and comprising
       a supply container for receiving the material;
       an application device for applying the material; and
       a weight sensor device having at least one weight sensor configured to sense an empty weight and a filling weight for the supply container; and
    a tractor implement management system, the tractor implement management system operationally connected to the weight sensor device and configured to generate control signals for controlling propulsion driving conditions of the tractor as the weight is diminished by application of material out from the supply container;
the agricultural machine configured to
    move by tractor driving;
    measure first weight signals by the weight sensor device, the first weight signals indicative of a first driving condition for the movement of the agricultural machine;
    provide first tractor control signals in the tractor implement management system, the first tractor control signals generated in response to the first weight signals and configured to apply a first control condition to the tractor driving; and apply the first tractor control signals to control the tractor driving.

12. The agricultural machine according to claim 11, wherein the application device is selected from the following group: spreader, sprayer, and seeder.

* * * * *